(12) United States Patent
Ender

(10) Patent No.: US 10,063,010 B2
(45) Date of Patent: Aug. 28, 2018

(54) CONNECTOR PART

(71) Applicant: NEUTRIK AG, Schaan (LI)

(72) Inventor: Norbert Ender, Fraxern (AT)

(73) Assignee: Neutrik AG, Schaan (LI)

( * ) Notice: Subject to any disclaimer, the term of this patent is extended or adjusted under 35 U.S.C. 154(b) by 464 days.

(21) Appl. No.: 14/552,606

(22) Filed: Nov. 25, 2014

(65) Prior Publication Data

US 2015/0155652 A1 Jun. 4, 2015

(30) Foreign Application Priority Data

Nov. 29, 2013 (DE) .......................... 10 2013 017 989

(51) Int. Cl.
| | |
|---|---|
| H01R 13/629 | (2006.01) |
| H01R 13/627 | (2006.01) |
| F16B 17/00 | (2006.01) |
| G02B 6/38 | (2006.01) |

(52) U.S. Cl.
CPC ............ H01R 13/629 (2013.01); F16B 17/00 (2013.01); G02B 6/3893 (2013.01); H01R 13/6278 (2013.01); *Y10T 403/7075* (2015.01)

(58) Field of Classification Search
CPC .............. H01R 13/627; H01R 13/6275; H01R 13/6276; H01R 13/6271; H01R 13/6272; H01R 13/6278; H01R 13/62; Y10T 403/60; Y10T 403/602; Y10T 403/7039
See application file for complete search history.

(56) References Cited

U.S. PATENT DOCUMENTS

| | | | | |
|---|---|---|---|---|
| 1,910,296 A | * | 5/1933 | King ...................... | B21D 28/34 |
| | | | | 279/77 |
| 3,011,794 A | * | 12/1961 | Vaughn ............... | B25B 23/0035 |
| | | | | 279/76 |
| 3,890,051 A | * | 6/1975 | Biek ................... | B25B 23/0035 |
| | | | | 403/20 |

(Continued)

FOREIGN PATENT DOCUMENTS

| | | |
|---|---|---|
| DE | 35 39 988 A1 | 5/1987 |
| DE | 69027345 T2 | 8/1990 |

(Continued)

OTHER PUBLICATIONS

European Search Report for EP Application EP 14 00 3354, dated Mar. 20, 2015.

(Continued)

*Primary Examiner* — Michael P Ferguson
(74) *Attorney, Agent, or Firm* — Harris Beach PLLC; Neal L. Slifkin

(57) ABSTRACT

Connector part for connecting to a mating connector part, wherein the connector part has at least one locking device for locking the connector part to the mating connector part, wherein the locking device has at least one pretensioning element and at least one locking element for engaging in a locking element receiver of the mating connector part in an engagement position of the locking element, and the locking element is elastically pretensioned by means of a pretensioning element in a locking direction toward the engagement position and the locking element can be moved in a release direction angled to the locking direction out of the engagement position into a release position.

7 Claims, 3 Drawing Sheets

(56) References Cited

U.S. PATENT DOCUMENTS

| | | | | |
|---|---|---|---|---|
| 4,610,564 | A * | 9/1986 | Vantouroux | H01R 13/62 |
| | | | | 279/30 |
| 4,762,505 | A | 8/1988 | Asick et al. | |
| 5,357,835 | A * | 10/1994 | Moellering | B26D 7/2614 |
| | | | | 279/79 |
| 5,449,298 | A | 9/1995 | Fetterolf, Sr. et al. | |
| 5,749,747 | A * | 5/1998 | Inaba | H01R 13/641 |
| | | | | 439/352 |
| 6,489,560 | B1 * | 12/2002 | Wu | F21S 8/065 |
| | | | | 174/158 R |
| 6,592,404 | B2 | 7/2003 | Endo | |
| 6,761,593 | B2 * | 7/2004 | Hu | H01R 24/58 |
| | | | | 439/346 |
| 6,851,341 | B2 * | 2/2005 | Iwinski | B25B 23/0021 |
| | | | | 403/322.3 |
| 7,097,325 | B2 * | 8/2006 | Wu | H01R 13/6276 |
| | | | | 362/382 |
| 7,384,295 | B2 * | 6/2008 | Hankey | H01R 13/4538 |
| | | | | 439/348 |
| 8,262,403 | B2 * | 9/2012 | Slippy | H01R 13/5808 |
| | | | | 439/353 |
| 8,991,286 | B2 * | 3/2015 | Davidson | B25B 23/0035 |
| | | | | 403/324 |
| 2003/0154836 | A1 | 8/2003 | Morehead | |
| 2013/0089999 | A1 | 4/2013 | Martin | |

FOREIGN PATENT DOCUMENTS

| | | |
|---|---|---|
| DE | 102008029033 A1 | 1/2010 |
| DE | 102012217278 A1 | 4/2013 |
| EP | 0382344 B1 | 8/1990 |
| FR | 2669897 A1 | 6/1992 |

OTHER PUBLICATIONS

NEUTRIK Product Guide 2012/13, published Mar. 21. 2012, Front Page and pp. 12, 13, 15, 17, 23, 66, 70, 116, and 139.
Chinese Office Action for 201410710210.X, dated Jan. 2, 2018, containing Chinese Search Report, (4 pages).

* cited by examiner

CONNECTOR PART

CROSS-REFERENCE TO RELATED APPLICATION

This application claims priority to German Patent Application No. DE 10 2013 017 989.0 filed Nov. 29, 2013, which is incorporated herein by reference in its entirety.

FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

BACKGROUND OF THE INVENTION

Field of the Invention

The present invention relates to a connector part for plugging together with a mating connector part, wherein the connector part has at least one locking device for locking the connector part to the mating connector part. In addition, the invention also relates to a plug-in connection.

Description of Related Art

Connector parts of the mentioned type are known from various prior art configurations. They can be used for connecting electrical and/or optical data lines, or also for supplying devices with power supply voltage or current. In actual practice, current and/or data cables that lead to a device are often improperly also used to pull the device, lower it down, or similar. Since the data and/or power cables and their connection to the respective device are generally not designed for this purpose, the partial or complete tearing away of the cable from the device or at least the tearing out of individual contacts may result. Furthermore, the cable may be overstretched with lasting damage done to the cable. All of this may result in the malfunction of the device or also in short circuits, cable fires, or similar.

BRIEF SUMMARY OF THE INVENTION

The object of the invention is to provide a connector part of the aforementioned type for a plug-in connection, which is released in said improper usage cases under defined conditions and can be reconnected by means of another characteristic.

To solve this task, according to the invention, a connector part of the aforementioned type is developed further such that the locking device has at least one pretensioning element and at least one locking element for engaging in a locking element receiver of the mating connector part in an engagement position of the locking element, and the locking element is elastically pretensioned by means of the pretensioning element in a locking direction toward the engagement position, and the locking element can be moved in a release direction angled to the locking direction from the engagement position into a release position.

In other words, the invention provides that the locking element can be moved in at least two directions that are separate from each other, namely, on the one hand in the locking direction and, on the other, in the release direction, particularly in a non-destructive and/or reversible manner. It is hereby possible that, when moving the locking element in the one direction, another characteristic is set in the other direction. In the release position, the locking element is arranged in a position in which it cannot engage in the locking element receiver of the mating connector part. This also applies to the other preferably provided release position described further below.

As mentioned, the release direction and the locking direction are arranged in a manner that they are angled to each other. This means that they lie neither coaxially nor parallel to each other. Thus, they form angles deviating from 0°, 180° and whole number multiples of 180° with each other.

The connector part and the mating connector part form a plug-in connection in their fully plugged together state. In said fully plugged together state, the locking element engages in its engagement position in the locking element receiver of the mating connector part to lock the connector part and the mating connector part to each other. Advantageously, this engagement of the locking element of the connector part in the locking element receiver of the mating connector part pertains to a detent connection latching elastically by means of the pretensioning element. The pretensioning element elastically pretensions the locking element in the locking direction toward the engagement position. To this end, the pretensioning element may be designed in a variable manner. Various types of springs, e.g., coil springs, leaf springs, torsion springs or similar may be used. These springs may be manufactured out of metal or other suitable materials. However, the pretensioning element may also involve an elastomer body or similar. Provided in a particularly preferred manner is a locking element that is elastically pretensioned solely by means of the pretensioning element. In this case, the connector part thus makes do with a single pretensioning element for the required pretensioning. Alternatively, two or more pretensioning elements may be provided for this purpose.

Particularly preferred embodiments of the invention provide that the locking element can be moved against the preload of the pretensioning element out of the engagement position into a direction opposite the locking direction into another release position. In these cases, the locking element can thus be moved at least in three directions, namely, in the locking direction, in the direction opposite to this, and in the release direction. Naturally more than one angled release direction and thus more than two release positions can also be possible. The movement of the locking element in the release direction occurs preferably against a preload of the locking element by means of the pretensioning element. The associated opposite return movement of the locking element from the release position into the engagement position occurs advantageously by means of the pretensioning element. Particularly preferred embodiments provide that, starting in the engagement position, moving the locking element in the direction opposite the locking direction, larger forces are necessary than for moving the locking element in the release direction. For example, it may be provided that the pretensioning element pretensions the locking element in the locking direction more forcefully than in the release direction. This can be used for example so that, when connecting the connector part and the mating connector part to produce a plug-in connection, the locking element can be moved with a relatively small force in the release direction into the release position, while when disconnecting the plug-in connection, in other words when pulling the connector part and the mating connector part apart, the locking element must be moved in the direction opposite the locking direction into the subsequent release position, wherein a substantially greater force must be overcome in said embodiments. This is an example of how, when connecting the connector part and the mating connector part, the characteristics can be specifically configured in a different manner than when pulling this plug-in connection apart. In particular, this can be used in such a manner that in the event of improper use as mentioned earlier, in other words, e.g., when improperly pulling a device by the power or data cable, the connector part and the mating connector part disconnect at a certain, preconfigured threshold force value, while the forces, which must be overcome when reconnecting the connector part and the mating connector part, are much lower. The respective forces to be overcome can be adjusted very precisely by selecting a corresponding pretensioning element and/or the corresponding angles and geometries. Particularly preferred variants in this context provide that the pretensioning of the pretensioning element can be adjusted by means of an adjusting element.

Particularly preferred variants of the invention provide that the maximum force of the pretensioning element acts in the locking direction. In all other directions, in other words, particularly also in the release direction, the pretensioning element then acts with smaller forces on the locking elements. It may also be provided that in the release direction, no forces or hardly any forces are exerted by the pretensioning element on the locking element. When constructing a pretensioning element in the form of a coil spring, it may be ensured for example that the maximum force acts in the locking direction, by the center axis of the coil spring being arranged parallel or coaxially to the locking direction.

Preferred variants of the invention provide that the locking element is mounted in or on the connector part in a linearly displaceable manner in the locking direction and in the associated opposite direction. A displacement, in other words a linear movement, of the locking element is fundamentally also possible in the release direction. However, preferred embodiments provide that the locking element is mounted pivotably in the release direction. A superimposition of a linear translation motion and a pivot motion may also exist to move the locking element in the release direction. The release direction in particular must thus not be configured necessarily in a linear manner.

As pointed out earlier, when connecting the connector part and the mating connector part, the locking element may be movable in the release direction into the release position. However, a movement of the locking element in the release direction may also be used for a simple, specific disconnecting of the connector part and the mating connector part. To this end, it may be provided for example that on the locking element, there is arranged an attachment element for an externally actuatable, pivotable and/or displaceable actuating element of the connector part. By actuating the actuating element, e.g., manually, a relatively low-force movement of the locking element in the release direction into the release position is possible to disconnect the connector part and the mating connector part from each other in a targeted manner. To this end, the actuating element may be mounted in a pivotable and/or also displaceable manner, e.g., on the housing of the connector part.

Basically, the connector part according to the invention can be constructed as male or female. However, particularly preferred embodiments of the invention provide that the connector part is a socket into which the mating connector part can be pushed. When connecting the connector part and the mating connector part, the mating connector part in these cases is inserted at least partially into a corresponding receiver space of the connector part constructed as a socket. The socket may be constructed as an independent component to be arranged in or on a housing of a device or also on a cable. However, it is also conceivable that the socket is integrated directly in the housing of a corresponding device. A connector part in the form of a socket can also be referred to in corresponding applications as a chassis connector.

Regardless of whether the connector part is male or female or constructed as a socket, preferred variants advantageously provide that the connector part can be connected to the mating connector part in a connection direction and the connection direction and the locking direction are arranged at an acute angle to each other of less than 90°.

Besides the connector part per se, the invention also relates to a plug-in connection, which is characterized in that, according to the invention, it has a connector part and a mating connector part, wherein the locking element of the connector part engages, in a fully connected state of the connector part and the mating connector part, in the engagement position in the locking element receiver of the mating connector part. Naturally, in such plug-in connections according to the invention, multiple connector parts according to the invention can be connected to multiple mating connector parts. It is equally possible that the plug-in connections have a corresponding connector part and multiple mating connector parts and vice versa.

It is preferably provided that the locking element, when connecting the connector part and the mating connector part, is moved in the release direction into the release position. To disconnect the plug-in connection, in other words to pull apart the connector part and the mating connector part, in the event of improper use, it is advantageously provided that the locking element is moved against the preload of the pretensioning element out of the engagement position in the direction opposite the locking direction into the release position. For a targeted disconnection of the plug-in connection, the locking element is advantageously moved in the release direction out of the engagement position into the release position. To do so, the locking element is advantageously moved by the aforementioned pivotable and/or displaceable actuating element, which contacts the attachment element of the locking element.

Connector parts according to the invention and corresponding mating connector parts or plug-in connections can be designed for diverse application areas. For example, they can be used for power supply purposes and just as well for data transmission or also combined forms of power supply and data transmission. Power supply refers to connecting a work tool or other device to a public or internal power network to supply power. For example, it may be the conventional public 230-volt and 50-Hz three-phase alternating current network in Europe. In North America, such a public power grid would be the single-phase, three-wire network with a grid voltage of 120 and 240 volts and a network frequency of 60 Hz. Connector parts according to the invention can naturally also be used for high-voltage applications, direct current applications, and so on.

Particularly preferred are connector parts according to the invention for supplying power to hand-operated work tools, such as drills, saws, grinding tools, and similar.

BRIEF DESCRIPTION OF THE SEVERAL VIEWS OF THE DRAWINGS

Additional features and details of a preferred embodiment of the invention are explained below by means of the drawing descriptions.

DETAILED DESCRIPTION OF THE INVENTION

Figure 1:
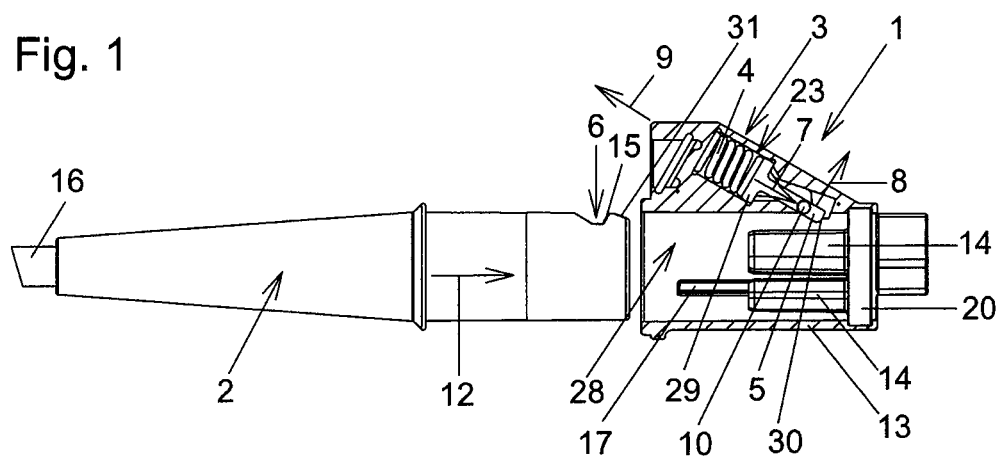
FIGS. 1 to 6 depict various positions when a connector part according to the invention is connected to and disconnected from the corresponding mating connector part.

In the depicted embodiment, mating connector part 2 pertains to a cable connector to which a cable 16 is attached. For example, it could be a power supply cable or a data cable. Connector part 1 according to the invention with locking device 3 is constructed as a socket or a chassis connector part. Housing 13 of this connector part 1 may be constructed as a separate component or also integrated into the housing of a corresponding device, particularly hand-operated work tools such as those referred to previously. Connecting connector part 1 and mating connector part 2 occurs in connection direction 12. To disconnect connector part 1 and mating connector part 2, both of these parts of the plug-in connection must be pulled apart in the direction opposite connection direction 12. Locking device 3 is part of connector part 1 and is arranged here in housing 13 of connector part 1 in a corresponding receiver space 23. When being connected, mating connector part 2 is pushed into receiver opening 28 of housing 13 of connector part 1. So that connector part 1 and mating connector part 2 can only be connected to each other in a single position, corresponding indexing means may be provided as they are executed here, e.g., by the index track 17 of housing 13 of connector part 1. Mating connector part 2 has a corresponding groove that is not visible here. In receiver opening 28 of connector part 1, there are also contact sleeves 14, which as explained later, accommodate electrical contacts 18 of this embodiment. In the depicted embodiment, housing 13 of connector part 1 is constructed in three parts in the form of a housing part 21 of housing part 22 and contact carrier 20. However, this can naturally be executed differently, e.g., as a one-piece housing 13. In any event, contact carrier 20 has the already mentioned contact sleeves 14.

FIGS. 1 to 6 depict housing 13, except for contact carriers 20, in a longitudinal cross-section. In the depicted embodiment, this can be achieved, e.g., by removing housing part 22 from housing part 21. In these cross-sectional illustrations, one can readily see pretensioning element 4 and locking element 5 of locking device 3. Both parts are arranged in the aforementioned receiving space 23 of housing 13. Pretensioning element 14 in the depicted embodiment is a coil spring preferably made of metal. This pretensioning element 4 elastically pretensions locking element 5.

The maximum force of pretensioning element 4 acts in locking direction 7. In the depicted embodiment, this is achieved by the coil spring, which forms pretensioning element 4, being arranged with its center axis coaxially to locking direction 7. In the depicted embodiment, locking element 5 has a pressure plate 29. Pretensioning element 4 acts via pressure plate 29 on locking element 5. On the side opposite pressure plate 29, locking element 5 has a locking lug 30 with which it engages into locking element receiver 6 of mating connector part 2 in the engagement position. On locking element 5, there is also provided attachment element 10, which, as explained later, serves to deflect locking element 5 specifically in release direction 8 by means of actuating element 11.

Deviating from the embodiment depicted here, an actuator could be provided to adjust the pretensioning of pretensioning element 4 in locking direction 7. For example, it could be an adjusting screw, not depicted here, which acts on pretensioning element 4 in locking direction 7 and with which pretensioning element 4 is further compressed to increase the pretensioning or relieved to decrease the pretensioning. This adjustment element would advantageously act on pretensioning element 4 on the side opposite of locking element 5.

Also drawn in FIGS. 1 to 6 are direction 9 opposite locking direction 7 as well as release direction 8 and connection direction 12.

Figure 2:
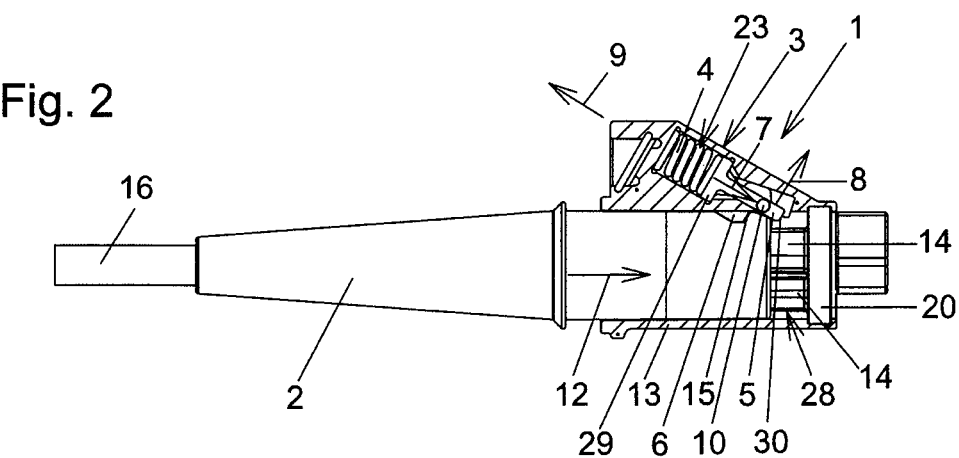
Figure 3:
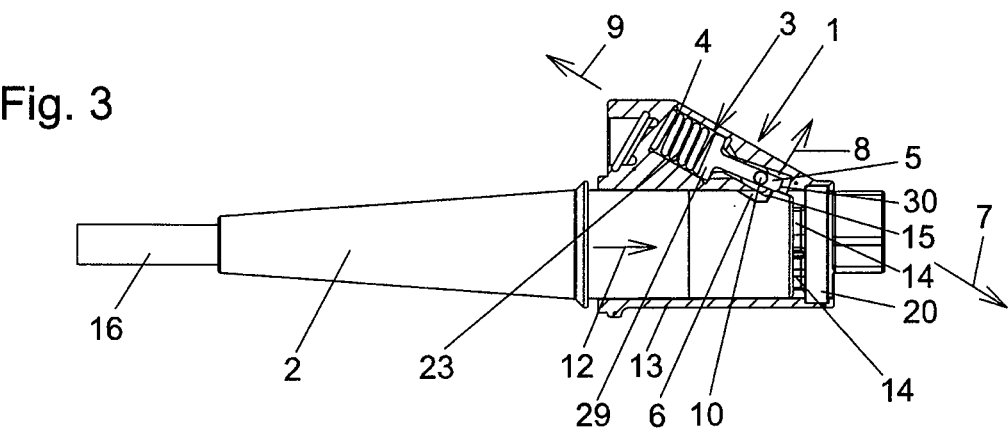
Figure 4:
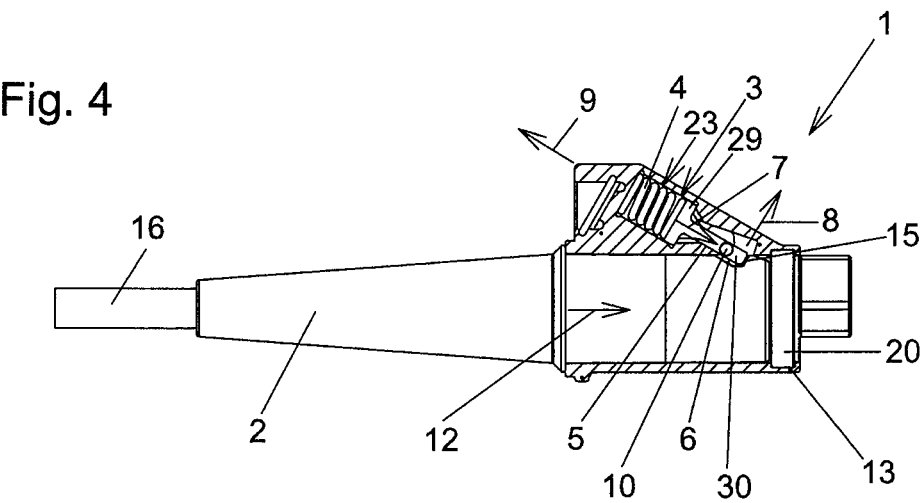

FIG. 1 depicts connector part 1 and mating connector part 2 in a state where they are disconnected from each other. By connecting this plug-in connection, in other words by inserting mating connector part 2 into connector part 1, constructed here as a socket, in connection direction 12, the front end, here furnished with a chamfer 31, of mating connector part 2 contacts locking element 5 positioned in the engagement position. This situation is depicted in FIG. 2. By inserting mating connector part 2 further into connector part 1 in connection direction 12, locking element 5 will deflect into release direction 8 angled to locking direction 7. Locking element 5 or particularly its locking lug 30 is hereby moved out of the engagement position according to FIGS. 1 and 2 into the release position according to FIG. 3. In this release position according to FIG. 3, the front end of mating connector part 2 or its chamfer 31 can be pushed past locking lug 30 or locking element 5 until locking element 5 is moved back into the engagement position by pretensioning element 4. This is depicted in FIG. 4. In this completely pushed together state of connector part 1 and mating connector part 2, locking element 5 engages, in its engagement position, into locking element receiver 6 of mating connector part 2. In the depicted embodiment, locking element 5 in this position is at abutment surface 15, which borders locking element receiver 6 on the one side. As one can readily see in the comparison of FIGS. 2, 3, and 4, the movement of locking element 5 in release direction 8 and in the opposite direction is a pivot movement. As already explained earlier, this is provided in a preferable manner, but must not necessarily be like this. It would also be conceivable to displace the entire locking element 5 in release direction 8 or to execute an overlapping of a pivot movement and a displacement movement.

In any event, receiver space 23 is designed in such a manner that with its bordering walls it guides and seats locking element 5 accordingly.

Figure 5:
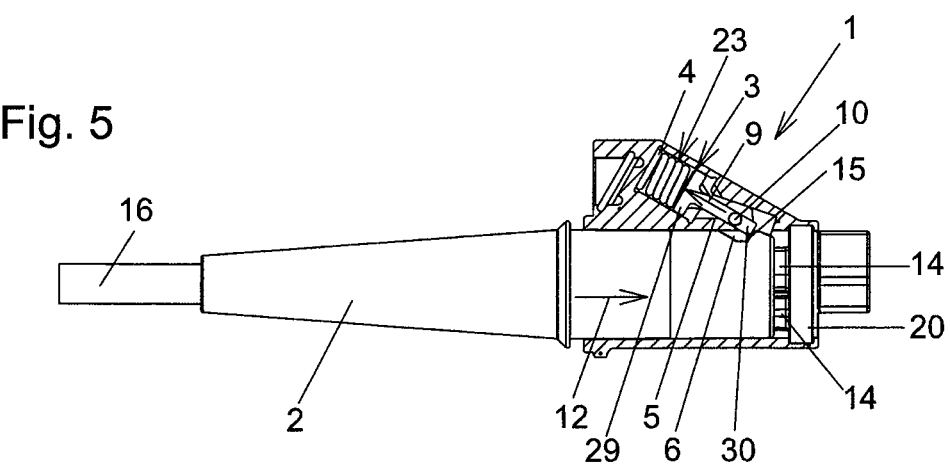

FIG. 5 now displays a case of improper use, in which by a corresponding tug on cable 16 against the plug-together direction 12, the plug-in connection is disconnected. In the depicted embodiment, locking element 5, which engages in locking element receiver 6 and touches abutment surface 15, must be pushed in direction 9 opposite locking direction 7 against the maximum force of pretensioning element 4. Only when the additional release position, in which locking element 5 releases abutment surface 15, is reached by means of the corresponding further displacement of locking element 5 in opposite direction 9, can mating connector part 2 be pulled out of connector part 1. As mentioned previously, it is hereby advantageously provided that starting in the engagement position, to move locking element 5 in direction 9 opposite locking direction 7, in other words in the improper use situation depicted in FIG. 5, greater forces are required than to move locking element 5 in release direction 8, as is the case in the depicted embodiment when connecting connector part 1 and mating connector part 2 according to FIGS. 2 to 4. In the event of improper use according to FIG. 5, significantly smaller forces must hereby be applied for connecting according to FIGS. 2 to 4 than for pulling apart. This is achieved in the depicted embodiment by having pretensioning element 4 preload locking element 5 in locking direction 7 more than in release direction 8.

Figure 6:
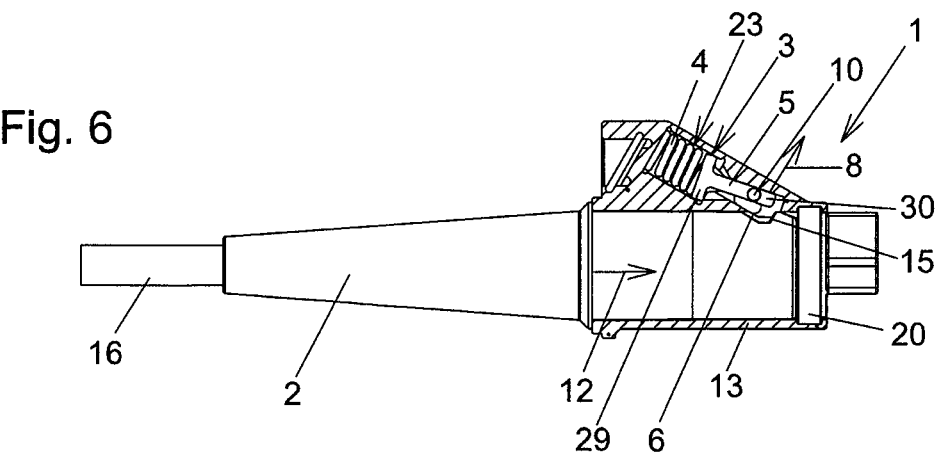

FIG. 6 depicts how locking element 5 is specifically moved in release direction 8 to release the lock and thus the plug-in connection between connector part 1 and mating connector part 2. The moving or pivoting of locking element 5 occurs in this case via actuating element 11, which is constructed here as a pivotable, externally actuatable lever on connector part 1 and contacts attachment element 10 of locking element 5 so as to be able to move it with relatively small forces in release direction 8.

Figure 7:
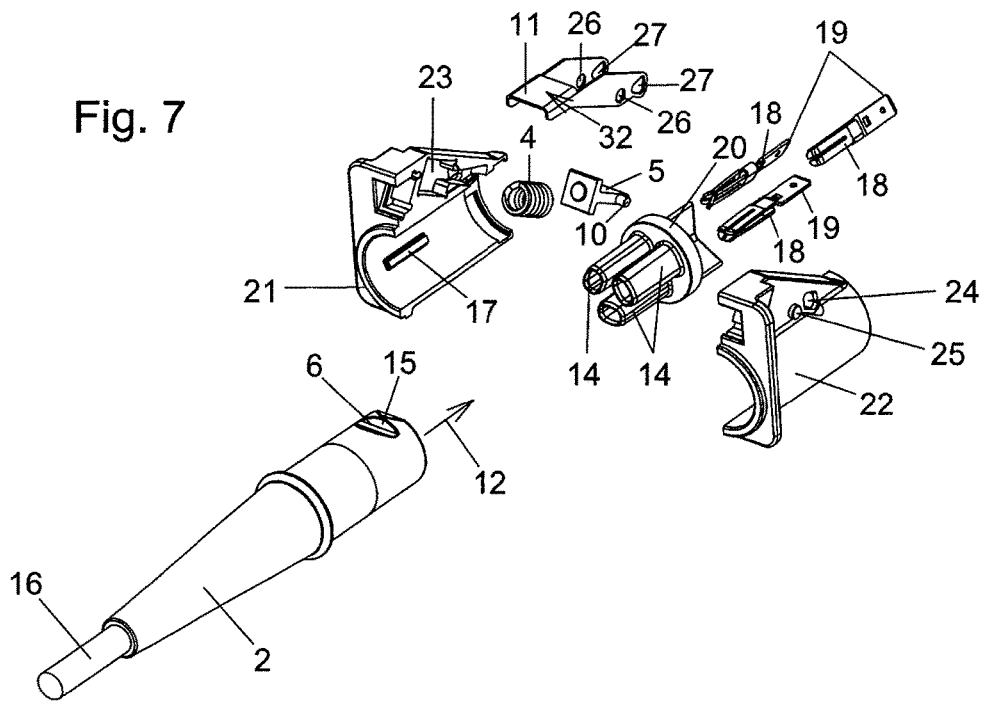
FIG. 7 depicts the mating connector part disconnected from the connector part, wherein the connector part is shown in an exploded view.

One can readily see actuating element 11 externally contacting attachment element 10 of locking element 5 in the exploded diagram according to FIG. 7. The depicted embodiment pertains to a pivotable lever. The pivot axis is formed by pivot pins 25 on housing 13. With the pivot pin receivers 26, actuating element 11 is seated on this pivot pin 25 in order to be pivoted around said pin. Attachment elements 10 of locking element 5 each penetrate a gate 24 in housing 13 or housing parts 21 and 22 and then engage in attachment element receivers 27 of actuating element 11. Gates 24 are constructed in such a manner that locking element 5 can be displaced both in locking direction 7 as well as in opposite direction 9 and can also be pivoted in release direction 8. By pressing on actuating surface 32 of actuating element 11, actuating element 11 is pivoted about pivot pin 25 to thereby pivot locking element 5 in release direction 8 into the release position according to FIG. 6 to thereby disconnect mating connector part 2 from connector part 1 with little effort.

Besides the other aforementioned components, in FIG. 7 one can also readily see index track 17 on housing part 21. It serves, as mentioned, to enable mating connector part 2 to be pushed only in one single defined position into receiver opening 28 of connector part 1. Incorrect polarity when connecting together can hereby be prevented for example. The groove of mating connector part 2, into which index track 17 is guided when connecting together, cannot be seen in the illustration depicted here. Indexing means of this type can naturally also be constructed in a totally different manner.

In FIG. 7, one can also readily see abutment surface 15 in locking element receiver 6 constructed in a notch-like manner. Also visible are electrical contacts 18 of connector part 1 of this embodiment, said contacts being arranged, in a fully assembled state, within contact sleeves 14. Electrical contacts 18 have connections 19 for connecting cables and similar. The corresponding mating contacts in mating connector part 2 are not additionally depicted. However, they may be constructed as known in prior art.

Figure 8:
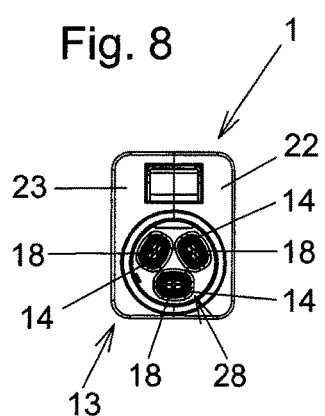
FIGS. 8 to 12 depict various illustrations of the connector part according to the invention of this embodiment.
Figure 9:
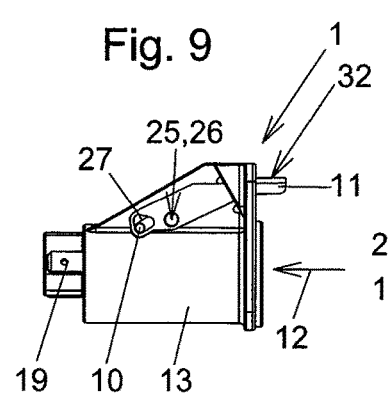

FIG. 8 depicts a front view of connector part 1, in which one can see into receiver opening 28, in which contact sleeves 14 with electrical contacts 18 of connector part 1 are readily visible. FIG. 9 depicts a side view of this connector part 1. Here, one can readily see the engagement of attachment element 10 in attachment element receiver 27 of actuating element 11. Also readily visible in this illustration is actuating surface 32 of actuating element 11. By pressing on actuating surface 32, actuating element 11 is pivoted to bring locking element 5, as depicted in FIG. 6, into the release position.

Figure 10:
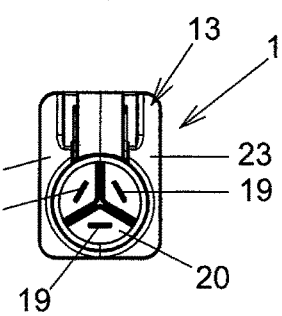

FIG. 10 depicts a rear view of connector part 1, in which one can readily see connections 19 of electrical contacts 18, arranged in contact carrier 20.

Figure 11:
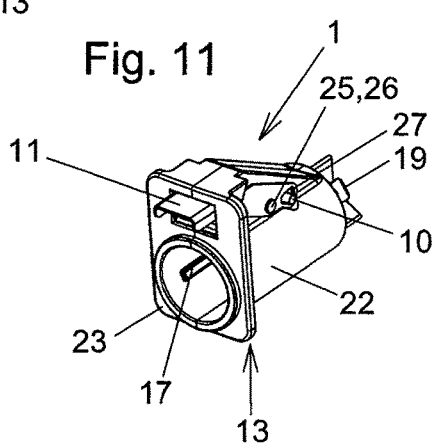
Figure 12:
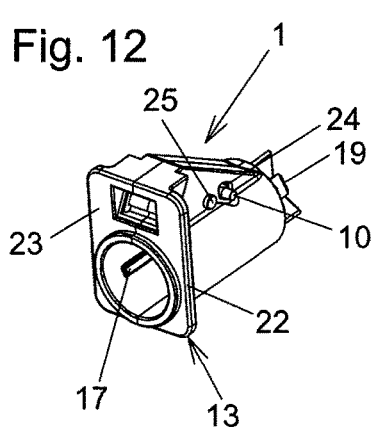

In the perspective view according to FIG. 11 of connector part 1, actuating element 11 is depicted. In the otherwise identical perspective view according to FIG. 12, actuating element 11 is left out so that one can readily see gate 24 in housing 13 or housing part 22.

| Legend for the reference numbers: | |
|---|---|
| 1 | Connector part |
| 2 | Mating connector part |
| 3 | Locking device |
| 4 | Pretensioning element |
| 5 | Locking element |
| 6 | Locking element receiver |
| 7 | Locking direction |
| 8 | Release direction |
| 9 | Opposite direction |
| 10 | Attachment element |
| 11 | Actuating element |
| 12 | Plug-in direction |
| 13 | Housing |
| 14 | Contact surface |
| 15 | Abutment surface |
| 16 | Cable |
| 17 | Index track |
| 18 | Electrical contact |
| 19 | Connection |
| 20 | Contact carrier |
| 21 | Housing part |
| 22 | Housing part |
| 23 | Receiver space |
| 24 | Slide |
| 25 | Pivot pin |
| 26 | Pivot pin receiver |
| 27 | Attachment element receiver |
| 28 | Receiver opening |
| 29 | Pressure plate |
| 30 | Locking lug |
| 31 | Chamfer |
| 32 | Actuating surface |

What is claimed is:

1. A connector part for plugging together with a mating connector part, the connector part comprising:
   a housing having a main cavity for receiving the mating connector part therein, and a receiver space intersecting the main cavity, the receiver space having a main portion and a locking lug receiving portion connecting with the main cavity, the locking lug receiving portion defining bordering walls comprising a first wall about parallel to a longitudinal axis of the main portion, and a second opposing wall being angled or tapered with respect to the first wall; and
   a locking device for locking the connector part to the mating connector part, the locking device comprising a pretensioning element and a locking element comprising a first end and a locking lug extending therefrom for engaging in a locking element receiver of the mating connector part in an engagement position of the locking element, the pretensioning element being seated against the first end in the main portion of the receiver space and the locking lug being seated in the locking lug receiving portion of the receiver space;

wherein the locking element is elastically pretensioned by means of the pretensioning element in a locking direction toward the engagement position, and the locking element being mounted so as to be movable in the receiver space of the housing, wherein the bordering walls of the receiver space guide and seat the locking element in a release direction angled to the locking direction out of the engagement position into a release position, the second opposing wall of the locking lug receiving portion being angled or tapered to allow the locking lug to be pivoted into the release position, and wherein the locking element is guided and seated by the bordering walls in a linearly displaceable manner against the pretensioning of the pretensioning element out of the engagement position in a direction opposite the locking direction into an additional release position, the first wall of the locking lug receiving portion being about parallel to the longitudinal axis of the main portion to allow the locking lug to travel linearly in the direction opposite the locking direction into the additional release position.

2. A connector part according to claim 1, wherein, the pretensioning element is oriented so that the pretensioning element pretensions the locking element in the locking direction more than in the release direction so that, starting in the engagement position, moving the locking element in the direction opposite the locking direction requires greater forces than moving the locking element in the release direction.

3. A connector part according to claim 1, wherein the pretensioning element is oriented so that the pretensioning element pretensions the locking element in the locking direction more than in the release direction and/or that the maximum force of the pretensioning element acts in the locking direction.

4. A connector part according to claim 1, wherein, on the locking element, there is arranged an attachment element for an externally actuatable, pivotable and/or displaceable actuating element of the connector part.

5. A connector part according to claim 1, wherein the connector part is a socket into which the mating connector part can be inserted.

6. A connector part according to claim 1, wherein the connector part can be connected in a plug-in direction to the mating connector part and the plug-in direction and the locking direction are arranged in an acute angle less than 90° relative to each other.

7. A plug-in connection, wherein the plug-in connection has a connector part according to claim 1, and a mating connector part, wherein the locking element of the connector part engages, in a fully plugged-in state of the connector part and the mating connector part, in the engagement position in a locking element receiver of the mating connector part.

* * * * *